United States Patent
Dutterer

(10) Patent No.: US 10,126,182 B2
(45) Date of Patent: Nov. 13, 2018

(54) LIGHT EMITTING THERMOMETER SYSTEM

(71) Applicant: Wendy Dutterer, Gettysburg, PA (US)

(72) Inventor: Wendy Dutterer, Gettysburg, PA (US)

(*) Notice: Subject to any disclaimer, the term of this patent is extended or adjusted under 35 U.S.C. 154(b) by 213 days.

(21) Appl. No.: 15/150,036

(22) Filed: May 9, 2016

(65) Prior Publication Data
US 2017/0322093 A1    Nov. 9, 2017

(51) Int. Cl.
| | | |
|---|---|---|
| *G01K 1/00* | (2006.01) |
| *G01K 7/00* | (2006.01) |
| *G01K 13/00* | (2006.01) |
| *F21V 33/00* | (2006.01) |
| *F21V 23/04* | (2006.01) |
| *F21L 4/00* | (2006.01) |
| *F21V 5/04* | (2006.01) |

(52) U.S. Cl.
CPC .............. *G01K 13/002* (2013.01); *F21L 4/00* (2013.01); *F21V 5/04* (2013.01); *F21V 23/0414* (2013.01); *F21V 33/0068* (2013.01); *G01K 7/00* (2013.01)

(58) Field of Classification Search
USPC ........................................ 374/208, 163, 170
See application file for complete search history.

(56) References Cited

U.S. PATENT DOCUMENTS

| | | | |
|---|---|---|---|
| 2,554,854 A | 5/1951 | Chomes | |
| 2,761,057 A | 8/1956 | Modell | |
| 2,797,308 A | 6/1957 | Best | |
| 6,454,045 B1 | 9/2002 | Ryan | |
| 6,886,979 B2 | 5/2005 | Conforti | |
| D592,930 S | 5/2009 | Cai | |
| 7,726,878 B2 | 6/2010 | Ishimaro et al. | |
| 2005/0080354 A1* | 4/2005 | Crossley .............. | A61B 1/2275 600/549 |
| 2005/0083991 A1* | 4/2005 | Wong ........................ | G01J 5/02 374/131 |
| 2006/0062276 A1* | 3/2006 | Conforti .................. | G01K 1/06 374/163 |
| 2011/0304471 A1* | 12/2011 | Ko ............................ | G01J 5/02 340/664 |

* cited by examiner

*Primary Examiner* — Mirellys Jagan

(57) ABSTRACT

A light emitting thermometer system includes a digital thermometer that has a rear end, a probe end and a display. The probe end may be placed into contact with an animal. A lighting unit is provided and the lighting unit is coupled to the digital thermometer. Thus, the lighting unit may selectively illuminate the animal when the probe end is placed into contact with the animal. The lighting unit includes a light emitter that is removably coupled to the lighting unit.

8 Claims, 4 Drawing Sheets

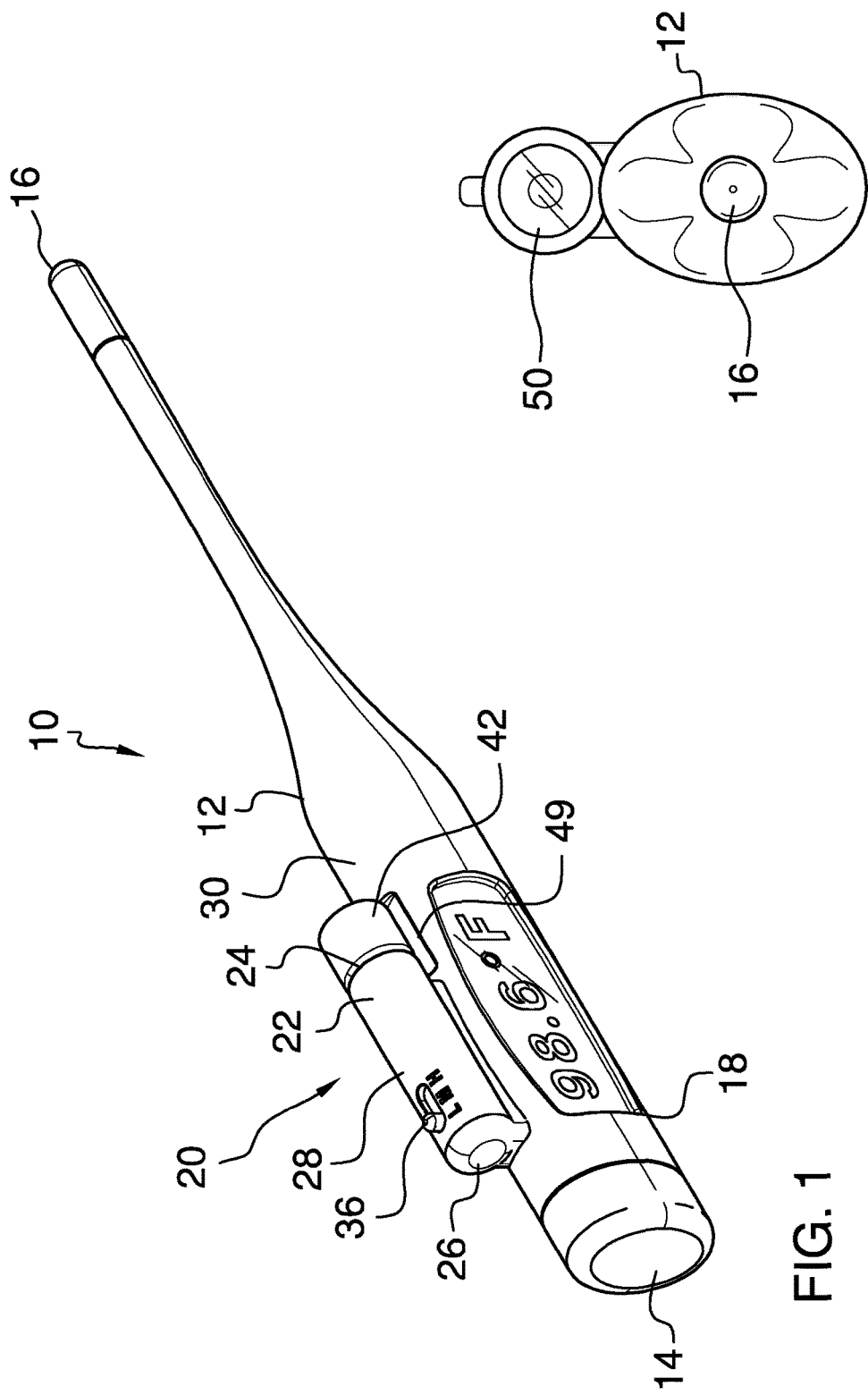

LIGHT EMITTING THERMOMETER SYSTEM

BACKGROUND OF THE DISCLOSURE

Field of the Disclosure

The disclosure relates to thermometer devices and more particularly pertains to a new thermometer device for combining a light emitter and a digital thermometer.

SUMMARY OF THE DISCLOSURE

An embodiment of the disclosure meets the needs presented above by generally comprising a digital thermometer that has a rear end, a probe end and a display. The probe end may be placed into contact with an animal. A lighting unit is provided and the lighting unit is coupled to the digital thermometer. Thus, the lighting unit may selectively illuminate the animal when the probe end is placed into contact with the animal. The lighting unit includes a light emitter that is removably coupled to the lighting unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a perspective view of a light emitting thermometer system according to an embodiment of the disclosure.

FIG. 2 is a front view of an embodiment of the disclosure.

DESCRIPTION OF THE PREFERRED EMBODIMENT

Figure 3:
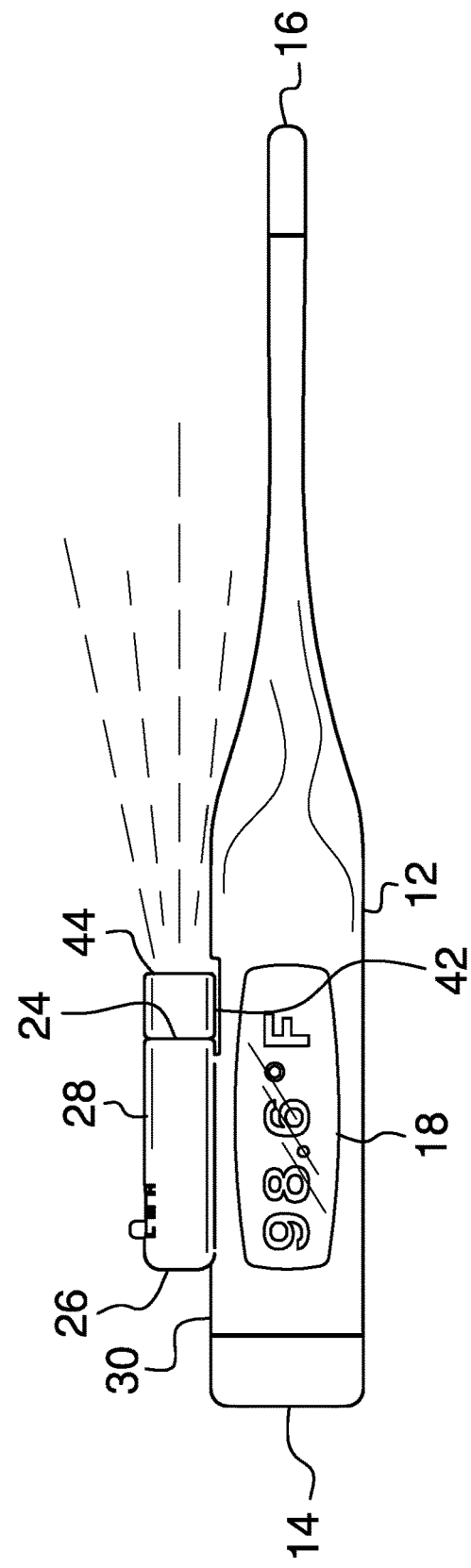
FIG. 3 is a right side view of an embodiment of the disclosure.
Figure 4:
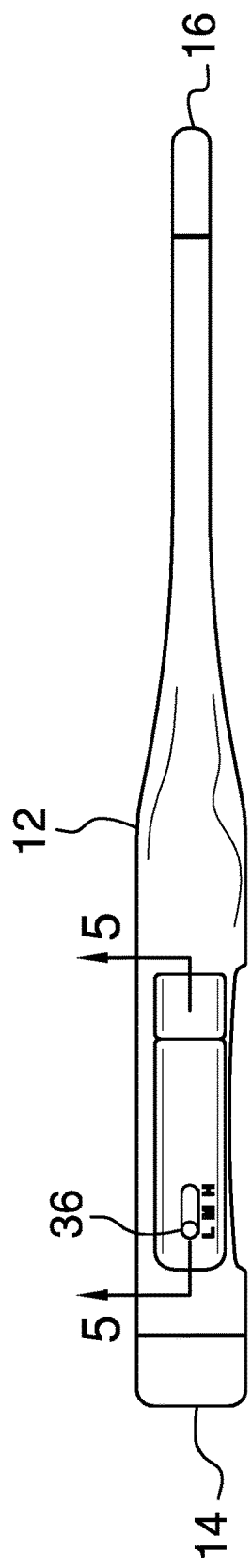
FIG. 4 is a top view of an embodiment of the disclosure.
Figure 5:
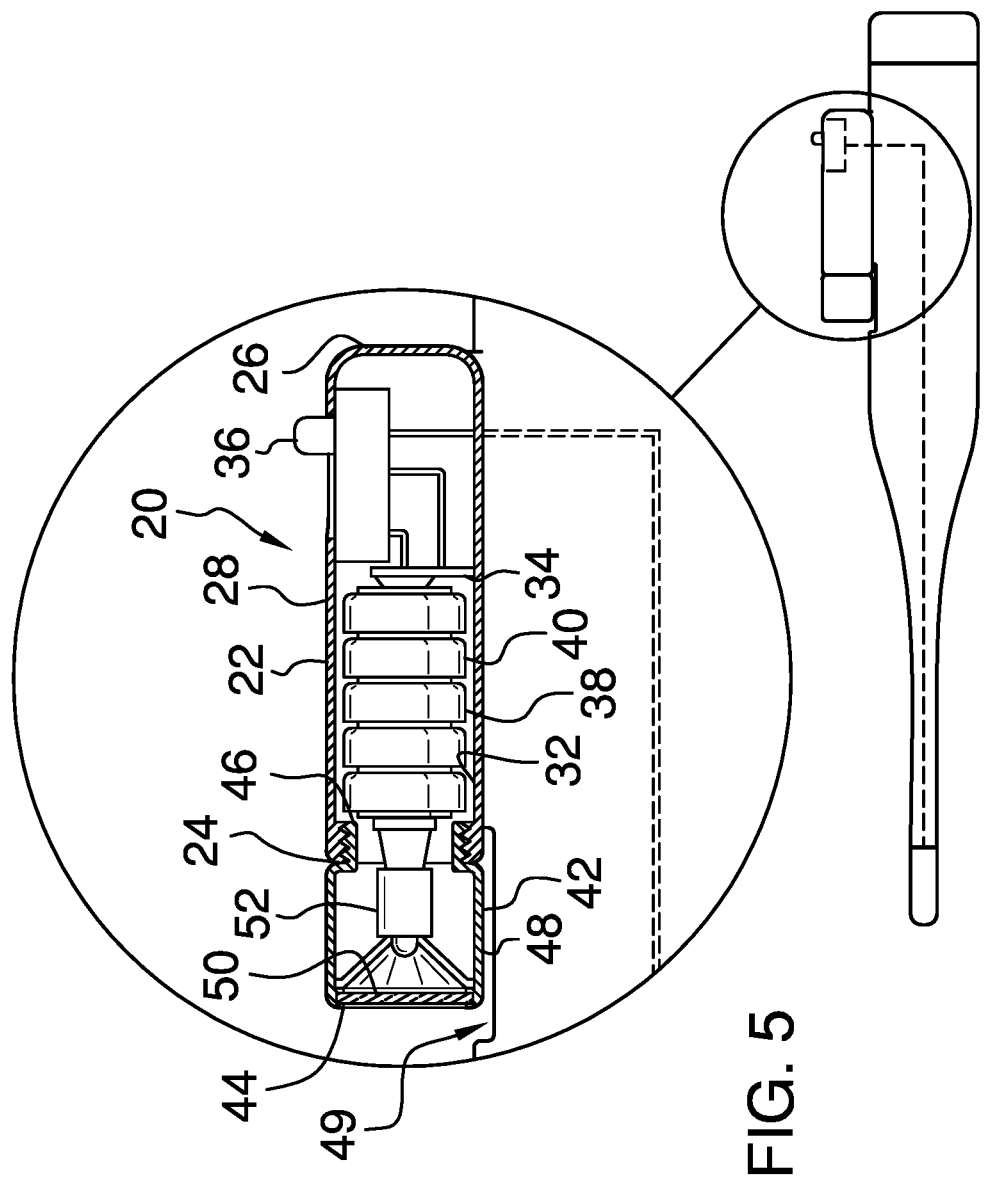
FIG. 5 is a cross sectional view taken along line 5-5 of FIG. 4 of an embodiment of the disclosure.

With reference now to the drawings, and in particular to FIGS. 1 through 5 thereof, a new thermometer device embodying the principles and concepts of an embodiment of the disclosure and generally designated by the reference numeral 10 will be described.

As best illustrated in FIGS. 1 through 5, the light emitting thermometer system 10 generally comprises a digital thermometer 12 that has a rear end 14, a probe end 16 and a display 18. The probe end 16 may be placed into contact with an animal. Thus, the digital thermometer 12 may detect a temperature of the animal. The display 18 displays a temperature of the animal. The digital thermometer 12 may be a digital thermometer of any conventional design. The animal may be a horse or the like. The probe end 16 may be an electrically sensitive probe end 16 thereby facilitating the probe end 16 to detect when the probe end 16 is placed into contact with the animal.

A lighting unit 20 is coupled to the digital thermometer 12. The lighting unit 20 may selectively illuminate the animal when the probe end 16 is placed into contact with the animal. The lighting unit 20 comprises a housing 22 that has a front end 24, a back end 26 and an outer wall 28 extending between the front end 24 and the back end 26. The front end 24 is open and the outer wall 28 is coupled to the digital thermometer 12. The digital thermometer 12 may have a top side 30 and the lighting unit 20 may be positioned on the top side 30.

The front end 24 is directed toward the probe end 16 of the digital thermometer 12. The housing 22 is positioned closer to the rear end 14 than the probe end 16. The outer wall 28 has an inner surface 32. The inner surface 32 is threaded adjacent to the front end 24.

A contact 34 is positioned within the housing 22. The contact 34 is positioned closer to the back end 26 than the front end 24. A switch 36 is coupled to the housing 22 and the switch 36 may be manipulated. The switch 36 is electrically coupled to the contact 34. The switch 36 is positionable in a low position, a medium position and a high position.

A power supply 38 is removably positioned within the housing 22. The power supply 38 is in electrical communication with the contact 34 when the power supply 38 is positioned in the housing 22. The power supply 38 comprises at least one battery 40. The at least one battery 40 may comprise a button cell or the like.

A cap 42 is provided that has a primary end 44, a secondary end 46 and an outer surface 48 extending between the primary end 44 and the secondary end 46. The outer surface 48 is threaded adjacent to the secondary end 46. Each of the primary end 44 and the secondary end 46 is open. The outer surface 48 threadably engages the inner surface 32 of the housing 22. Thus, the cap 42 is removably coupled to the front end 24 of the housing 22. The primary end 44 is directed toward the probe end 16 when the cap 42 is removably coupled to the housing 22.

The top side 30 of the digital thermometer 12 has a recess 49 extending downwardly therein. The recess 49 is aligned with the cap 42. Thus, the recess 49 facilitates the cap 42 to be gripped when the cap 42 is removed from and coupled to the housing 22. Additionally, the recess 49 inhibits the cap 42 from frictionally engaging the digital thermometer 12.

A lens 50 is positioned in the primary end 44 and the lens 50 completely covers the primary end 44. The lens 50 is comprised of a translucent material. A light emitter 52 is positioned within the cap 42 and the light emitter 52 is positioned behind the lens 50. The light emitter 52 is in electrical communication with the power supply 38 when the cap 42 is removably coupled to the housing 22. The light emitter 52 is electrically coupled to the probe end 16. Thus, the light emitter 52 is turned on when the probe end 16 is placed in contact with the animal.

The switch 36 turns the light emitter 52 on when the switch 36 is manipulated. Thus, the light emitter 52 may illuminate the animal. The light emitter 52 emits a minimum amount of light when the switch 36 is in the low position. The light emitter 52 emits a medium amount of light when the switch 36 is in the medium position. The light emitter 52 emits a maximum amount of light when the switch 36 is in the high position. The light emitter 52 may comprise an LED or the like.

In use, the digital thermometer 12 is manipulated to take a temperature of an animal. The probe end 16 is placed into physical contact with the animal's rectum and the display 18 displays the temperature of the animal. The light emitter 52 is turned on when the probe end 16 is placed into physical contact with the animal. The switch 36 is manipulated into a selected one of the low position, the medium position and the high position. Thus, the light emitter 52 emits the corresponding minimum, medium and maximum amount of light onto the animal. The light emitter 52 facilitates the digital thermometer 12 to be accurately positioned in the animal's rectum thereby enhancing comfort of the animal.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A light emitting thermometer system comprising:
a digital thermometer having a rear end, a probe end and a display, said probe end being configured to be placed into contact with an animal; and
a lighting unit being coupled to said digital thermometer wherein said lighting unit is configured to selectively illuminate the animal when said probe end is placed into contact with the animal, said lighting unit including a light emitter being removably coupled to said lighting unit.

2. The system according to claim 1, wherein said lighting unit comprises a housing having a front end, a back end and an outer wall extending between said front end and said back end, said front end being open, said outer wall being coupled to said digital thermometer having said front end being directed toward said probe end of said digital thermometer, said housing being positioned closer to said rear end than said probe end, said outer wall having an inner surface.

3. The system according to claim 2, further comprising:
a contact being positioned within said housing, said contact being positioned closer to said back end than said front end; and
a switch being coupled to said housing wherein said switch is configured to be manipulated, said switch being electrically coupled to said contact.

4. The system according to claim 3, further comprising a power supply being removably positioned within said housing, said power supply being in electrical communication with said contact when said power supply is positioned in said housing, said power supply comprising at least one battery.

5. The system according to claim 2, further comprising a cap having a primary end and a secondary end, each of said primary end and said secondary end being open, said secondary end threadably engaging said inner surface of said housing such that said cap is removably coupled to said front end of said housing, said primary end being directed toward said probe end when said cap is removably coupled to said housing.

6. The system according to claim 5, further comprising a lens being positioned in said primary end such that said lens completely covers said primary end, said lens being comprised of a translucent material.

7. The system according to claim 6, wherein:
said lighting unit includes a power supply and a switch; and
said light emitter is positioned within said cap, said light emitter being positioned behind said lens, said light emitter being in electrical communication with said power supply when said cap is removably coupled to said housing, said switch turning said light emitter on when said switch is manipulated wherein said light emitter is configured to illuminate the animal.

8. A light emitting thermometer system comprising:
a digital thermometer having a rear end, a probe end and a display, said probe end being configured to be placed into contact with an animal thereby facilitating said display to display a temperature of the animal; and
a lighting unit being coupled to said digital thermometer wherein said lighting unit is configured to selectively illuminate the animal when said probe end is placed into contact with the animal, said lighting unit including a light emitter being removably coupled to said lighting unit, said lighting unit comprising:
a housing having a front end, a back end and an outer wall extending between said front end and said back end, said front end being open, said outer wall being coupled to said digital thermometer having said front end being directed toward said probe end of said digital thermometer, said housing being positioned closer to said rear end than said probe end, said outer wall having an inner surface,
a contact being positioned within said housing, said contact being positioned closer to said back end than said front end,
a switch being coupled to said housing wherein said switch is configured to be manipulated, said switch being electrically coupled to said contact,
a power supply being removably positioned within said housing, said power supply being in electrical communication with said contact when said power supply is positioned in said housing, said power supply comprising at least one battery,
a cap having a primary end and a secondary end, each of said primary end and said secondary end being open, said secondary end threadably engaging said inner surface of said housing such that said cap is removably coupled to said front end of said housing, said primary end being directed toward said probe end when said cap is removably coupled to said housing,
a lens being positioned in said primary end such that said lens completely covers said primary end, said lens being comprised of a translucent material, and
said light emitter being positioned within said cap, said light emitter being positioned behind said lens, said light emitter being in electrical communication with said power supply when said cap is removably coupled to said housing, said switch turning said light emitter on when said switch is manipulated wherein said light emitter is configured to illuminate the animal.

* * * * *